(12) United States Patent
Moser et al.

(10) Patent No.: US 7,001,120 B2
(45) Date of Patent: Feb. 21, 2006

(54) DRILLING TOOL

(75) Inventors: Bernhard Moser, Altshausen (DE);
Rainer Widmann, Langenargen (DE);
Marco Lang, Ravensburg (DE)

(73) Assignee: Hawera Probst GmbH, Ravensburg (DE)

( * ) Notice: Subject to any disclaimer, the term of this patent is extended or adjusted under 35 U.S.C. 154(b) by 484 days.

(21) Appl. No.: 10/262,060

(22) Filed: Sep. 30, 2002

(65) Prior Publication Data

US 2003/0077134 A1    Apr. 24, 2003

(30) Foreign Application Priority Data

Oct. 12, 2001 (DE) ................................ 101 50 287
Feb. 28, 2002 (DE) ................................ 102 08 630

(51) Int. Cl.
*B23B 51/02*    (2006.01)
(52) U.S. Cl. ...................... 408/225; 175/385; 175/394; 175/420.1
(58) Field of Classification Search ................ 175/385, 175/389, 394, 395, 415, 420.1, 426, 435, 175/427, 420; 408/223, 224, 225, 227, 230, 408/713
See application file for complete search history.

(56) References Cited

U.S. PATENT DOCUMENTS

| 1,746,046 | A | * | 2/1930 | McIntosh | ..................... 175/395 |
| 1,859,202 | A | * | 5/1932 | Emmons | ..................... 175/395 |
| 2,332,295 | A | * | 10/1943 | Bouchal | ..................... 408/211 |
| 3,997,279 | A | * | 12/1976 | Porter | ..................... 408/211 |
| 4,330,229 | A | | 5/1982 | Croydon | |
| 4,889,200 | A | * | 12/1989 | Moser | ..................... 175/394 |
| 5,061,127 | A | * | 10/1991 | Thomas | ..................... 408/212 |
| 5,312,207 | A | * | 5/1994 | Pomp | ..................... 408/212 |
| 5,735,648 | A | * | 4/1998 | Kleine | ..................... 408/144 |
| 5,836,410 | A | | 11/1998 | Kleine | |
| 6,026,918 | A | * | 2/2000 | Briese | ..................... 175/414 |
| 6,044,919 | A | | 4/2000 | Briese | |
| 6,102,634 | A | | 8/2000 | Turner et al. | |
| 6,227,774 | B1 | * | 5/2001 | Haughton et al. | ..................... 408/225 |

FOREIGN PATENT DOCUMENTS

| DE | 31 23 048 A1 | 8/1982 |
| DE | 40 12 772 A1 | 10/1991 |
| DE | 44 07 119 A1 | 6/1995 |
| DE | 44 42 266 A1 | 5/1996 |
| DE | 100 38 039 A1 | 2/2001 |
| DE | 100 09 732 A1 | 9/2001 |
| EP | 0 452 255 B1 | 10/1991 |
| FR | 2 540 424 A1 | 8/1984 |

* cited by examiner

*Primary Examiner*—Daniel W. Howell
(74) *Attorney, Agent, or Firm*—Robert Kinberg; Venable LLP; Steven J. Schwarz

(57) ABSTRACT

The invention relates to a drilling tool (36), in particular for working concrete, rock, masonry and suchlike materials, having a single- or multi-edge tool head with at least one cutting body (1) which comprises a central region (12) which is designed in a roof shape, has rake faces and flanks and is defined laterally by two outer regions (13, 14) set back in the effective direction of the drill. In this case, the ground surfaces of the central region (12) form a pyramidal point (15) while avoiding the formation of a chisel edge.

21 Claims, 8 Drawing Sheets

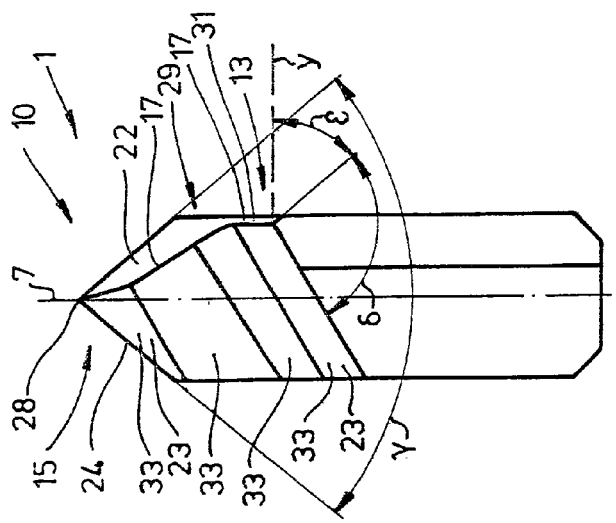
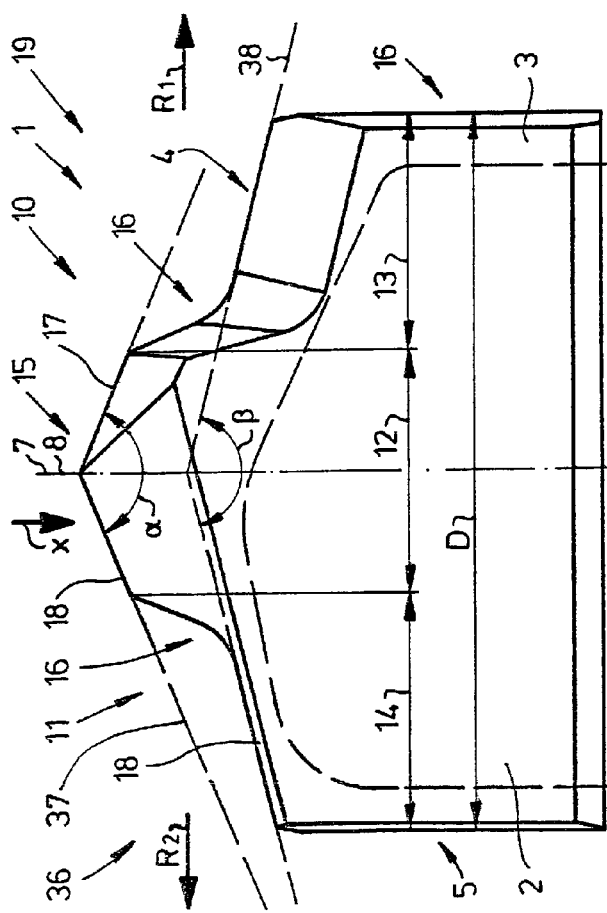
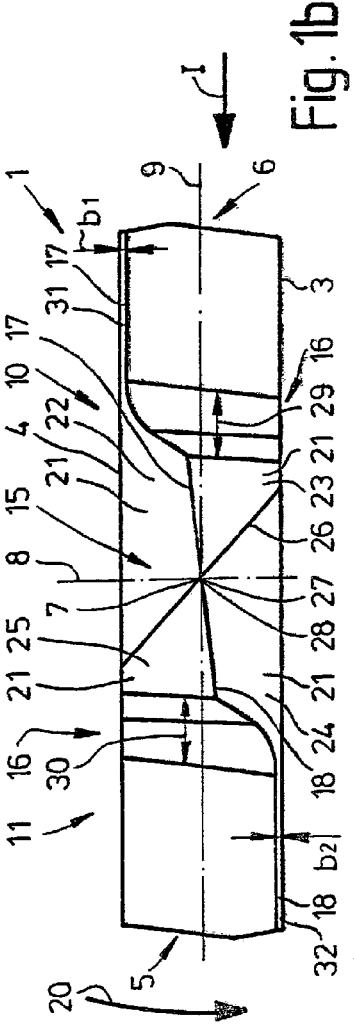
Fig. 1a
Fig. 1b
Fig. 1c

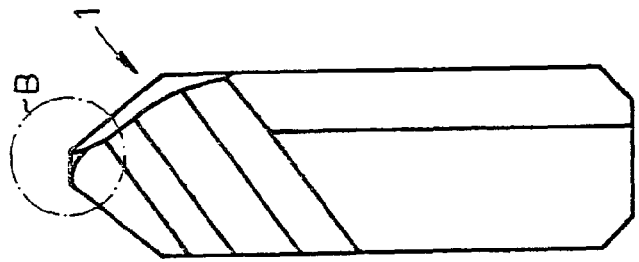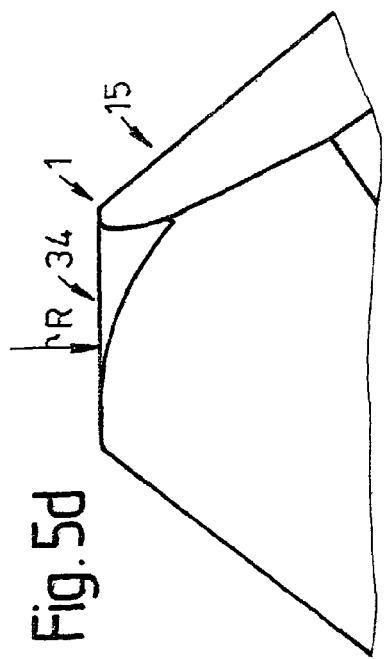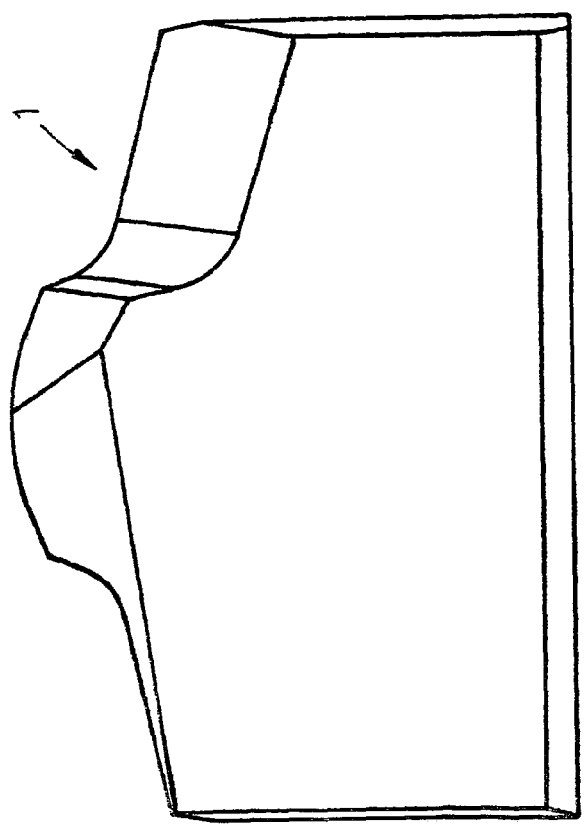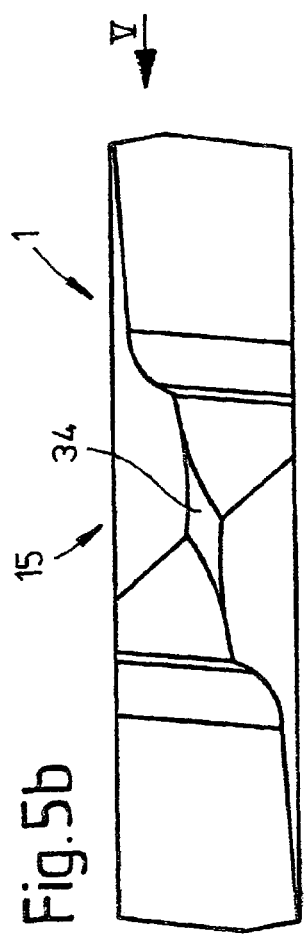

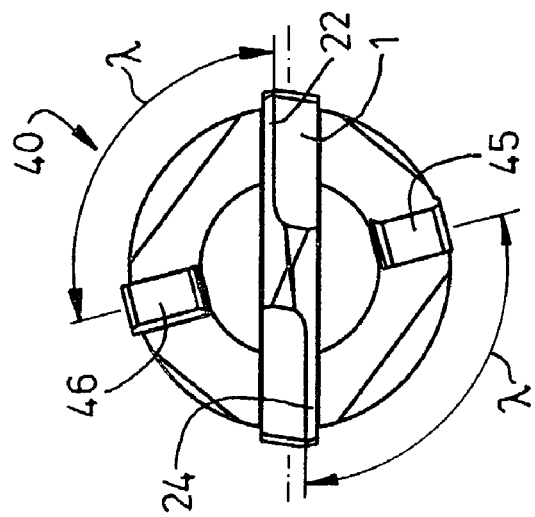
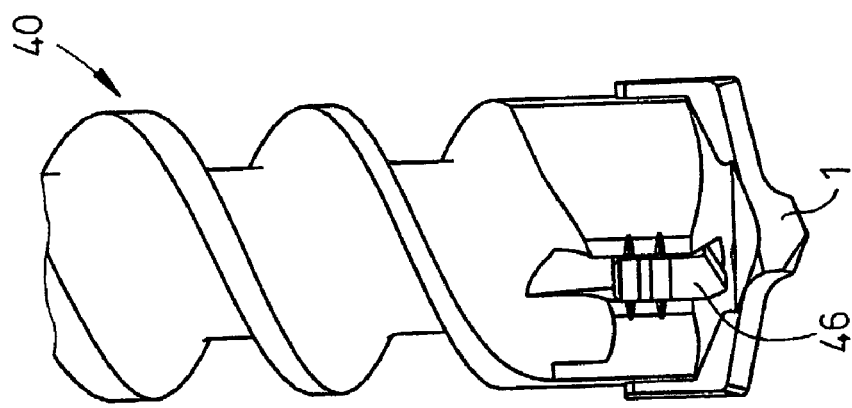
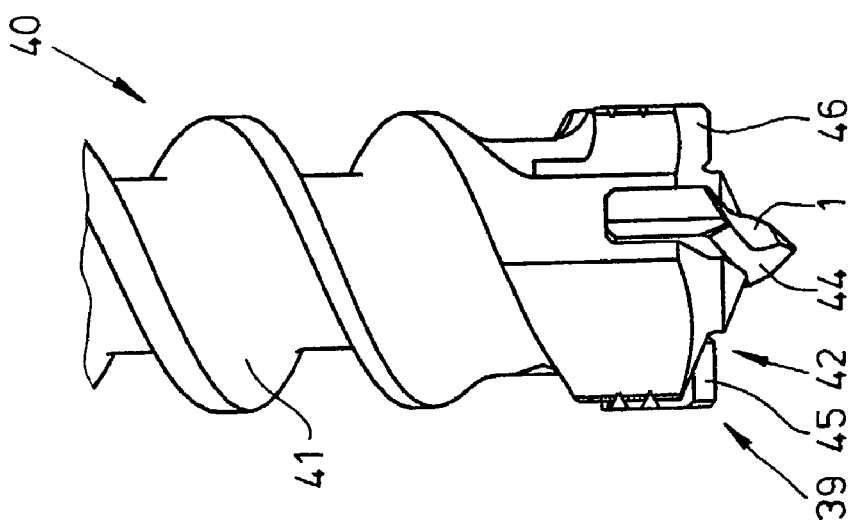

DRILLING TOOL

BACKGROUND OF THE INVENTION

The invention relates to a drilling tool having a single- or multi-edge tool head with at least one cutting body, the cutting body having a central region which is designed in a roof shape with rake faces and flanks, and two outer regions set back relative to the central region in a drilling direction of the drill, one outer region being positioned on either side of the central region in a direction perpendicular to the drilling direction.

Conventional drilling tools and in particular rock drills consist of a drill shank with a clamping end and of a drill head which in side view has a gabel-shaped cutting element which is preferably designed as a carbide tip (see, for example, FIG. 1 of EP 0 452 255 B1).

DE 100 38 039 A1 discloses such a drilling tool. This drilling tool, as cutting element, has a carbide tip which has a centering section lying radially on the inside and sections which lie on the outside and are stepped relative to the centering section lying radially on the inside. Starting from a central chisel edge (see FIG. 3c, reference numeral 40), the two lips of the cutting tip each have a continuous rake face and a flank running in a stepped manner via a shoulder.

Furthermore, DE 44 42 266 A1 discloses a carbide cutting tip which, starting from a chisel edge, has two lips which are each formed by a rake face and a flank and, in a region remote from the center longitudinal axis, each have an interruption due to a step, which is formed by an expansion joint.

U.S. Pat. No. 6,102,634 likewise discloses a cutting tip for a drilling tool. This cutting tip has two lips which run so as to start from a chisel edge and are each formed by a rake face and a flank in a central region close to the drill longitudinal axis. In a radially outer region remote from the drill longitudinal axis, the lips, while avoiding the formation of a rake face, are each formed solely by a cutting edge having a flank lying behind it. In plan view, the cutting edges in this case are formed by side edges of the cutting tip.

SUMMARY OF THE INVENTION

The object of the invention is to propose a drilling tool and in particular a cutting tip for a drilling tool, in which an improved removing capacity and an increased tool life are achieved by optimizing the geometry of the lips.

The invention is based on the knowledge that the cutting tip is configured in such a way that the drilling or cutting effect of the lips increases continuously or in stages with increasing distance from the center longitudinal axis of the tool in order to ensure optimum cutting, and that, on the other hand, it is necessary for the chiseling or percussion effect of the lips to increase toward the center longitudinal axis of the tool in order to achieve an optimum percussive capacity. This means that, in each region of the lip, there is a conflict of goals between the percussive capacity and the cutting capacity of the lips. Therefore the lips may be specifically designed in each region but not unilaterally for cutting or percussion. On the contrary, the tool must also be suitable for percussive use in the radially outer region of the lips and for cutting use in the radially inner region of the lips. According to the invention, such optimization of the tool is realized by a design of a pyramidal point in the central region of the tool. The advantages of such shaping or lip geometry are that the cutting edges run up to or approximately up to the tool longitudinal axis and thus an optimum cutting effect of the tool is maintained right into the region of the tool longitudinal axis. According to the invention, the required optimization of the tool is brought about in the outer region by a design of the cutting edges as bevels. The cutting edges are stabilized by the bevel-like design of the cutting edges running in the two outer regions. This also permits effective percussive use of the cutting edges despite optimum adaptation of the lips to the drilling effect or cutting effect. The central region is therefore optimally designed for the chiseling or percussion, which mainly takes place there, without losing cutting properties which are possibly required. The outer regions are also optimized for the drilling or cutting, and percussive use of the outer regions is ensured in such a way that no premature wear or fracture of the cutting edges occurs. That is to say that the design of the cutting edge as a bevel stabilizes the same for use as a drilling tool. Consequently, in order to stabilize the cutting edges or to avoid chipping of the same, chamfering of the sharp cutting edges is achieved by making a planar bevel or a rounded-off bevel (rounded-off portion) along the cutting edge. A bevel running in a planar or flat manner refers to an outer edge or inner edge which has a flat or planar chamfered surface or edge surface. An outer edge or inner edge which has a rounded portion in an elongated region approaching a line is to be understood as a rounded-off bevel within the scope of the invention. The flat beveling or chamfering or rounding-off of a region approaching a line results in a narrow effective area having the properties of a cutting edge.

According to an advantageous design of the subject matter of the invention, the bevel forming the cutting edge in the outer region has a measurable width as viewed in the direction of the course of the tool longitudinal axis (plan view of the drilling tool). This width strengthens the cutting edge without forming an otherwise conventional negative rake face. According to the invention, for drilling tools having an effective diameter of up to 25 mm, a bevel width of up to 0.5 mm, preferably 0.1 to 0.5 mm, is provided. Tools having an effective diameter of 25 mm to 50 mm are provided according to the invention with a bevel which has a width of up to 1 mm; widths of 0.5 mm to 1.0 mm are preferably provided here. For drilling tools having an effective diameter of over 50 mm, the invention provides bevel widths of up to 2 mm, bevel widths of 1 mm to 2 mm preferably being used. With regard to the width, the cutting edge designed according to the invention by a flat or rounded-off bevel therefore depends on the effective diameter of the drilling tool.

Furthermore, the invention provides for the bevel, in cross section, to be given a planar and/or concave and/or convex profile and/or a profile following a polyline. This enables the stability and the properties of the cutting edge formed by the bevel to be matched in a precise manner to the tool and the workpiece not only by the width of the effective area but also by its shaping.

According to a special embodiment of the subject matter of the invention, provision is made for the central region and the outer regions to be provided with different point angles, the point angle of the central region corresponding to the apex angle of the gable formed in side view by the central region. Likewise, the point angle which the outer regions form with one another corresponds to an apex angle of the gable which the outer regions define with one another in side view. Due to the different design of the point angles, the tool is likewise adapted to the different stresses in the central region and in the outer regions. A flatter position of the cutting edges of the outer regions leads to shortening of the cutting edges and thus, via an increased pressure on the cutting edge—the existing pressure is now distributed over a short cutting edge—to increased removal capacity. Furthermore, a point angle <180° in the outer region additionally assists the centering of the drilling tool. In the central region, a steeper orientation of the cutting edges leads to the formation of a more pointed pyramid or to the steeper position of the side surfaces of the pyramid and thus to easier penetration of the central region into the workpiece during percussive or hammering use. In particular, improved centering of the tool is achieved.

According to the invention, a difference of about 15 to 30 degrees is provided between the point angle of the central region and the point angle of the outer regions, in which case a concave and/or convex profile, or a profile approximated by a polyline, of the lips or of the legs of the point angles is also provided.

A further advantageous design of the subject matter of the invention provides for the pyramidal point to be designed in a dome shape in a top region. As a result, it is possible to specifically prevent randomly determined wear of the pyramidal point by shaping which is suitable for high percussive loads. In particular, provision is made for the point to be rounded off spherically or in an egg shape.

Furthermore, the invention provides for the bevel to be designed with a constant width. In this way, simple production of the bevel from the technical point of view, for example by shaping by a sintering process or by subsequent machining, is possible. By the bevel having a width which increases radially outward, it is possible to produce tools which can tolerate high percussion loads in particular even in the free end regions of the lips. A bevel having a width which decreases radially outward helps to obtain a tool which is optimally adapted to the percussion load, decreasing radially outward, in accordance with the materials to be worked. The specific design of the lip for the cutting operation consequently increases with increasing distance from the longitudinal center axis of the tool.

It is advantageous if the pyramidal point has an effective diameter which corresponds to at least 0.2 times an effective diameter D of the cutting tip. This provides for a drill point of stable design even in the case of relatively small drill diameters or cutting-tip diameters.

Carbide cutting tips having a beveled cutting edge can be produced in an especially simple and cost-effective manner from the technical point of view by appropriate shaping of the sintering tool. With regard to the forming of the bevels, a cutting tip produced in such a way requires no complicated mechanical rework.

According to an embodiment variant, the invention also provides for secondary lips to be assigned to a main lip. These secondary lips, for example as described in DE 44 07 119 A1, are arranged in a drill head having an essentially square or rectangular cross section, the main cutting body passing diagonally through the drill head, and the secondary lips, in plan view, being at an obtuse angle to the cutting faces of the main cutting body. The secondary lips assist the main lip in particular in the outer regions, in which the cutting and the percussion are of considerable importance. A specific design is possible between the main lip and the secondary lip. For example, the main lip can be optimized more for the cutting capacity, and the secondary lip can better meet the requirements with regard to percussive capacity. In this case, however, the main lip and the secondary lip are readily suitable for both types of load.

Further details and advantages of the invention follow from the description below of exemplary embodiments of the invention which are explained in more detail with reference to the drawings.

BRIEF DESCRIPTION OF DRAWINGS

In the drawings:

FIG. 1a shows a side view of a carbide cutting tip,

FIG. 1b shows a plan view of the cutting tip shown in FIG. 1a,

FIG. 1c shows a view of the cutting tip shown in FIG. 1b from arrow direction I, FIG. 5a shows a side view of a fifth carbide cutting tip, FIG. 5b shows a plan view of the cutting tip shown in FIG. 5a, FIG. 5c shows a view of the cutting tip shown in FIG. 5b from arrow direction V, FIG. 5d shows a view of the detail designated by B in FIG. 5c, FIG. 8b shows a representation rotated by about 90° of the hammer drill shown in FIG. 8a, and FIG. 8c shows a plan view from arrow direction VIIIc of the hammer drill shown in FIG. 8b.

DETAILED DESCRIPITION OF THE INVENTION

Figure 2C:
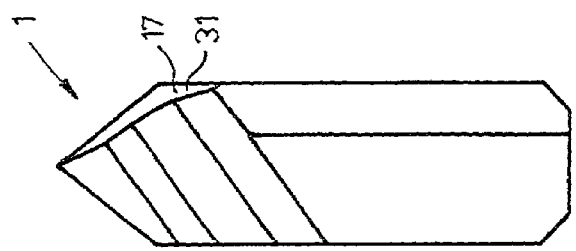
FIG. 2a shows a side view of a second carbide cutting tip.
FIG. 2b shows a plan view of the cutting tip shown in FIG. 2a, FIG. 2c shows a view of the cutting tip shown in FIG. 2b from arrow direction II

The drilling tool according to the invention is designated below as "tool". The carbide cutting tips shown in FIGS. 1a to 6d are also to be understood as a cutaway detail representation of a one-piece tool.

A cutting tip 1 is shown in side view in FIG. 1a. The cutting tip 1 has an effective diameter D and, inserted into a drill shank 2 indicated by broken lines, forms a complete drilling tool 36 with the latter. In this case, the cutting tip 1 is accommodated or held in the drill shank 2. The drill shank 2 encloses parallel side surfaces 3, 4 and allows further side surfaces 5, 6 of the cutting tip 1 to project freely in the radial direction beyond the drill shank 2. Passing through the cutting tip 1 is a tool longitudinal center axis 7, at which a transverse center plane 8 and a longitudinal center plane 9 intersect at right angles (also see FIG. 1b). Starting from the tool longitudinal center axis 7, lips 10, 11 run in radial directions $R_1$, $R_2$. The cutting tip 1 is subdivided in the radial direction into a central region 12 and two outer regions 13, 14 lying outside the central region 12. In the central region 12, the cutting tip 1 has a pyramidal point 15, which merges via steps 16 into the outer regions 13, 14. Starting from the center longitudinal axis 7, cutting edges 17, 18 of the lips 10, 11 run in the radial directions through the central region 12 into the outer regions 13, 14. The lips 10, 11 or cutting edges 17, 18 form a point angle a $\alpha=135°$ in the central region 12. In the outer regions 13, 14, imaginary extensions of the lips 10, 11 or cutting edges 17, 18 form a point angle of $\beta=150°$. In the side view, the cutting tip 1 has the shape of a gable 19, the gable side being formed by the side surfaces 3 and the acute angles $\alpha$, $\beta$ indicating the slopes of stepped roof surfaces. In the central region 12, the cutting edges 17, 18 define a lateral surface 37 of a cone (shown by broken lines), which is at a distance from a lateral surface 38 of a cone (indicated by broken lines) defined by the course of the cutting edges 17, 18 in the outer region 13, 14. That is to say that no mutual contact or no mutual intersection of the lateral surfaces 37, 38 of the cones takes place in the outer region 13, 14. This improves the centering effect of the central region 12, since the outer edges lying in the outer region 13, 14 do not come into engagement until later.

A plan view of the cutting tip 1 shown in FIG. 1a is depicted in FIG. 1b. The direction of rotation of the cutting tip 1 about the tool longitudinal center axis 7 during drilling is indicated by an arrow 20. The pyramidal point 15 is formed by four ground surfaces 21. These are a rake face 22 and a flank 23 which are assigned to the lip 10 and a rake face 24 and a flank 25 which are assigned to the lip 11. The rake face 22 and the flank 23 of the lip 10 are separated from one another by the cutting edge 17. The rake face 24 is separated from the flank 25 of the lip 11 by the cutting edge 18. The lips 10, 11 meet at a transition edge 26. The tip 28 of the pyramidal body 15 lies at the intersection 27 between the transition edge 26 and the cutting edges 17, 18. The flanks 23, 25 run from the central region 12 (see FIG. 1a) via the steps 16 into and through the outer regions 13, 14. The rake faces 22, 24 run out in transition regions 29, 30 and merge into cutting edges 17, 18 which are formed by bevels 31, 32. The outer regions 13, 14 therefore have no rake faces. In the outer regions 13, 14, the cutting edges 17, 18 are shaped as flat or rounded-off bevels 31, 32. The term "bevel" below always refers to a flat bevel or a bevel running in a planar manner and/or a bevel running in a rounded-off or arched manner. In the plan view, i.e. in the perpendicular projection from an arrow direction x (see FIG. 1a), the bevels 31, 32 have widths $b_1$, $b_2$. For cutting tips 1 having a diameter D up to 25 mm, these widths $b_1$, $b_2$ lie within a range of up to 0.5 mm, preferably about 0.1 mm to 0.5 mm. For cutting tips 1 having a diameter D of 25 mm to 50 mm, widths $b_1$, $b_2$ of the bevels 31, 32 up to 1 mm, preferably 0.5 mm to 1 mm, are to be provided. Cutting tips 1 having a diameter D which is greater than 50 mm have bevels 31, 32 with widths $b_1$, $b_2$ up to 2 mm, preferably 1 mm to 2 mm. The bevels in the outer regions 13, 14 essentially have widths $b_1$, $b_2$ uniform widths. The bevels 31, 32 merge into the rake faces 22, 24 in the transition regions 29, 30. With regard to the gable 19 which is described with reference to FIG. 1a and is formed by the side surface 3, the ground surfaces 21 are to be designated as roof surfaces.

A side view of the cutting tip 1 shown in FIG. 1b is depicted in FIG. 1c from the arrow direction I. In addition to the point angle $\alpha$ shown in FIG. 1a, the pyramidal point 15 is defined by a point angle $\gamma$ which lies in the transverse center plane 8 (see FIG. 1b). The point angle $\gamma$ is about 80° and indicates the angle which is enclosed by the rake faces 22, 24. Furthermore, the position of the bevel 31 or cutting edge 17 relative to the flank 23 is shown in FIG. 1c. The flank 23 is composed of four sectional surfaces 33. In the cutting tip 1 shown in FIGS. 1a to 1c, the flank 23, or that sectional surface 33 of the flank 23 which lies in the outer region 13, and the bevel 31 enclose an angle $\delta$ of about 95°. In other words, the bevel 31 runs inclined relative to a horizontal y having an angle of inclination $\epsilon$ of about 50°. The bevel 31 merges into the rake face 22 of the lip 10 in the transition region 29. The bevel 31 in the outer region 13 is not designed in the sense of a flat portion disposed perpendicularly to the tool longitudinal center axis 7 but acts as a slightly blunted and thus stabilized oblique cutting edge 17. The remarks made with respect to FIG. 1c relative to the lip 10 also apply by analogy to the lip 11, since the lips 10, 11 are arranged in a point-symmetric manner relative to the tool longitudinal center axis 7.

Figure 2A:
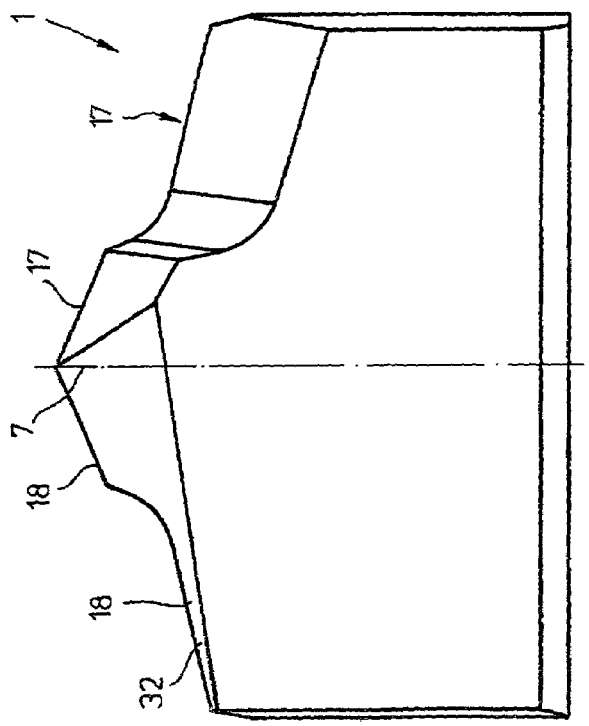
Figure 2B:
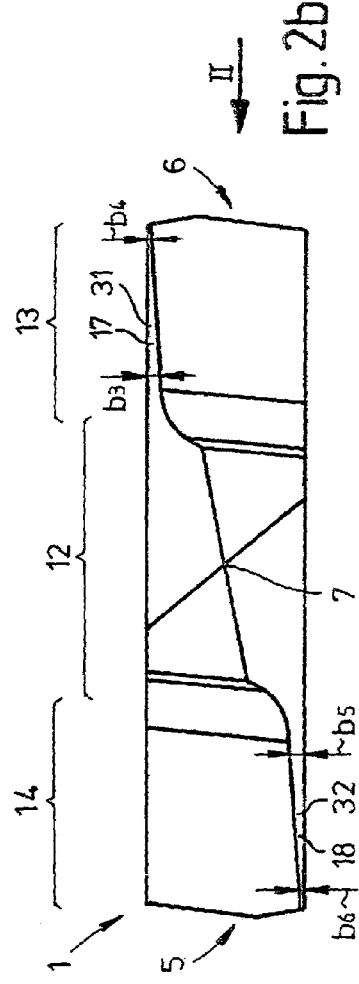

Shown in FIGS. 2a to 2c is a second cutting tip 1 which, unlike the cutting tip shown in FIGS. 1a to 1c, has cutting edges 17, 18 which become narrower radially outward toward the side surfaces 5, 6, the cutting edges 17, 18 being formed in outer regions 13, 14 as bevels 31, 32. In this case, the bevels 31, 32, in the perpendicular projection, as viewed in the direction of a tool longitudinal center axis 7, decrease approximately from dimensions $b_3$, $b_5$ to dimensions $b_4$, $b_6$. For the ratio of the dimensions, the following approximately applies: $b_3 \cong 2 \times b_4$ and $b_5 \cong 2 \times b_6$.

Figure 3C:
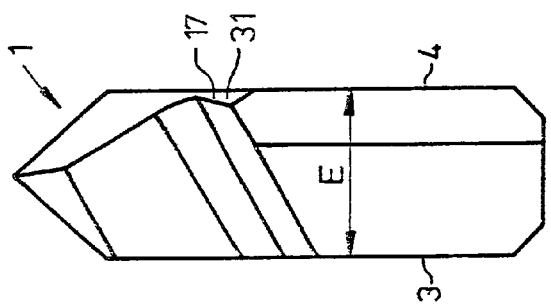
FIG. 3a shows a side view of a third carbide cutting tip.
FIG. 3b shows a plan view of the cutting tip shown in FIG. 3a, FIG. 3c shows a view of the cutting tip shown in FIG. 3b from arrow direction III.
Figure 3A:
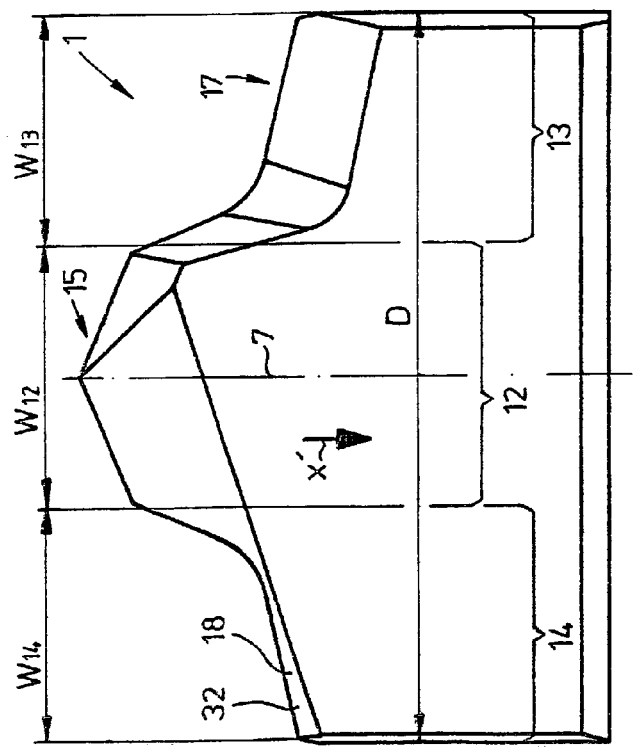
Figure 3B:
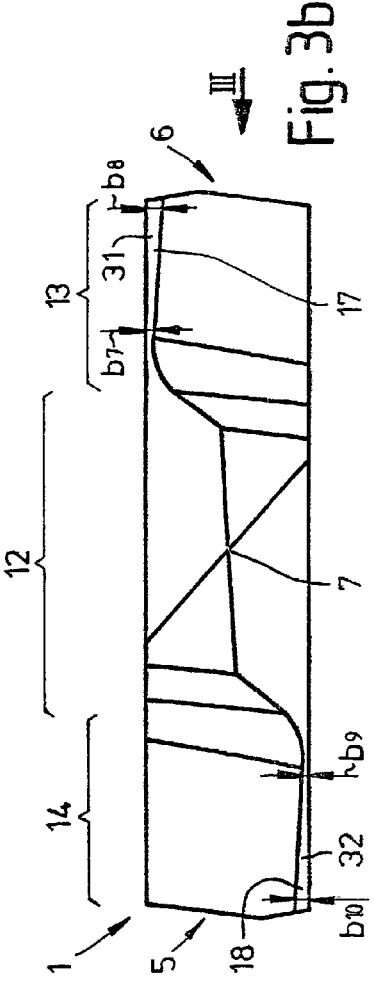
Figure 4C:
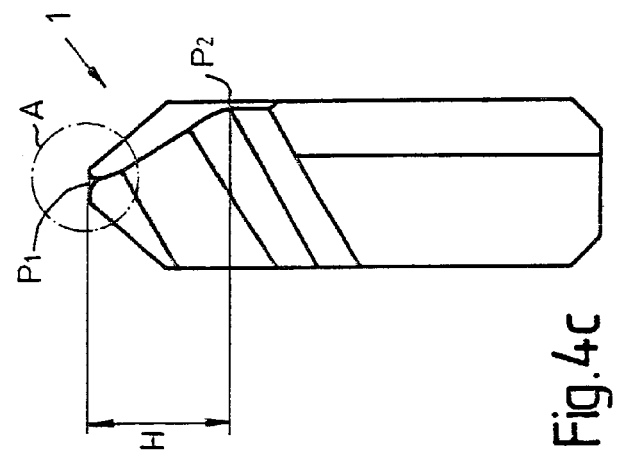
FIG. 4a shows a side view of a fourth carbide cutting tip.
FIG. 4b shows a plan view of the cutting tip shown in FIG. 4a, FIG. 4c shows a side view of the cutting tip shown in FIG. 4b from arrow direction IV.
FIG. 4d shows a detail view of the detail designated by A in FIG. 4c.
Figure 4D:
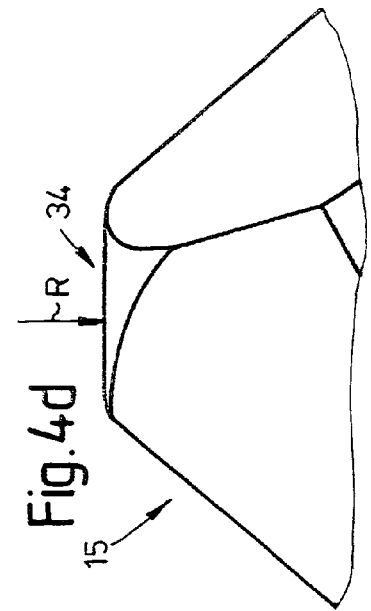
Figure 4A:
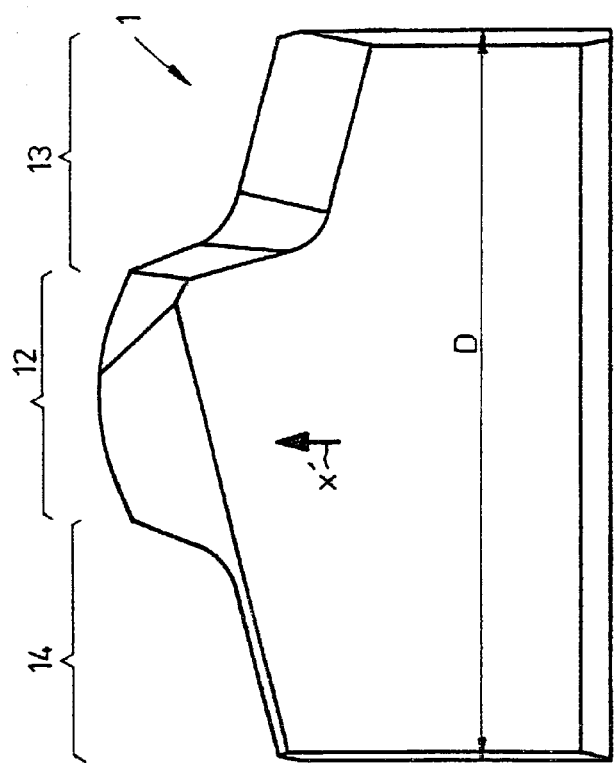
Figure 4B:
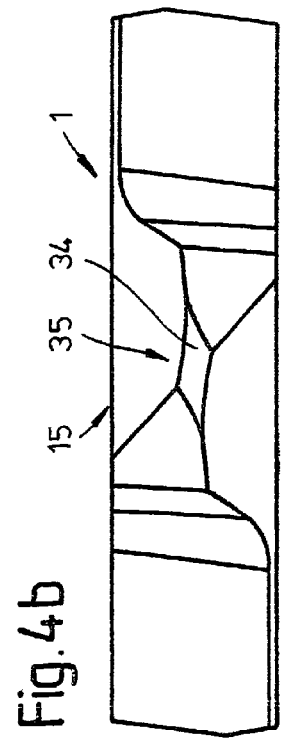
Figure 6C:
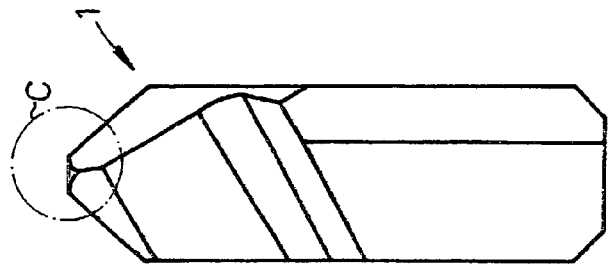
FIG. 6a shows a side view of a sixth carbide cutting tip.
FIG. 6b shows a plan view of the cutting tip shown in FIG. 6a, FIG. 6c shows a view of the cutting tip shown in FIG. 6b from arrow direction VI.
FIG. 6d shows a view of the detail designated by C in FIG. 6c.
Figure 6D:
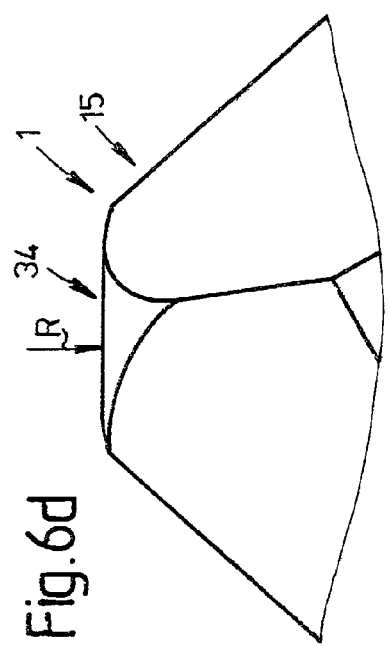
Figure 6A:
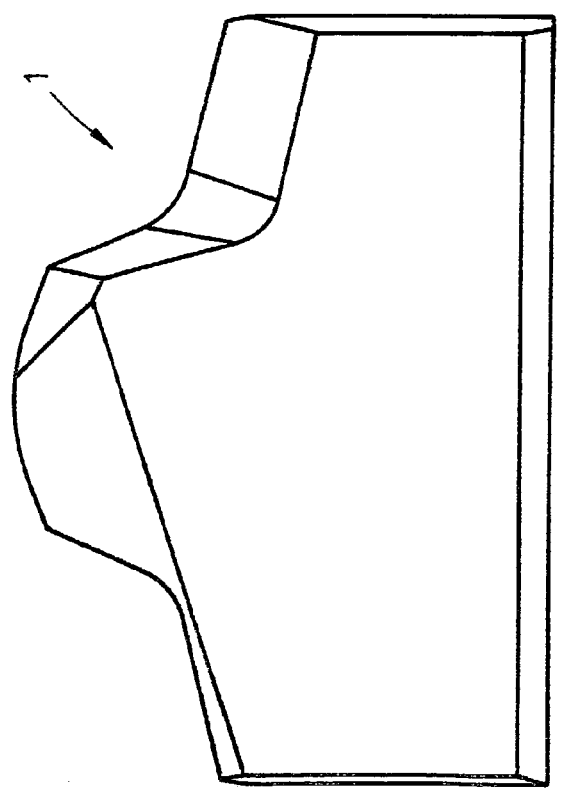
Figure 6B:
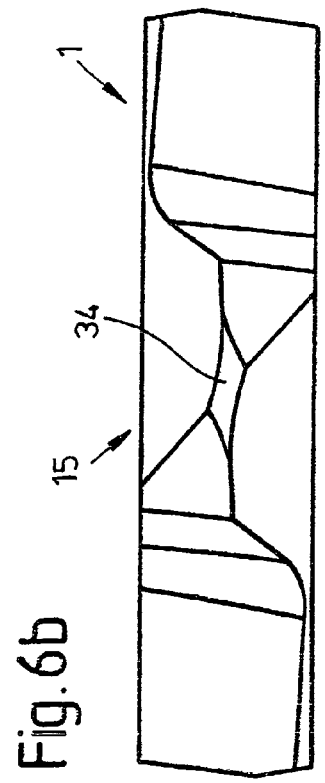

Shown in FIGS. 3a to 3c is a third cutting tip 1 which, unlike the cutting tip shown in FIGS. 1a to 1c, has cutting edges 17, 18 which become wider radially outward toward the side surfaces 5, 6, the cutting edges 17, 18 being formed in outer regions 13, 14 as bevels 31, 32. In this case, the bevels 31, 32, in the perpendicular projection, as viewed in the direction of a tool longitudinal center axis 7, increase approximately from dimensions $b_7$, $b_9$ to dimensions $b_8$, $b_{10}$. For the ratio of the dimensions, the following approximately applies: $b_8 \cong 2 \times b_7$ and $b_{10} \cong 2 \times b_9$. The cutting tip 1 shown in FIG. 3a has an effective diameter D with which it acts in effective direction x' on a workpiece to be worked. A central region 12 of the cutting tip 1 acts with a pyramidal point 15 on the workpiece and in this case has an effective diameter $W_{12}$. The outer regions 13, 14 act with effective sections $W_{13}$, $W_{14}$ on the workpiece. The effective diameter $W_{12}$ and the effective sections $W_{13}$, $W_{14}$ have approximately the same dimensions and $W_{12} \cong W_{13} \cong W_{14} \cong \frac{1}{3} \times D$. The effective diameter $W_{12}$ should at least have a size of about $0.2 \times D$. The cutting tip 1 has a thickness E, which determines the distance between the side surfaces 3, 4. This thickness E corresponds to about $0.2 \times D$.

Shown in FIGS. 4a to 4d is a fourth cutting tip 1 which, unlike the cutting tip shown in FIGS. 1a to 1c, has a pyramidal point 15 with a rounded-off tip 34. The rounded-off tip 34 is shown in an enlarged view in FIG. 4d and has a rounding radius R which corresponds approximately to an effective diameter D of the cutting tip 1. In the plan view, the rounded-off tip 34 has approximately the contour of a rhombus 35. In the effective direction x', the topmost point $P_1$ of a central region 12 or of the pyramidal point 15 is set back from a topmost point $P_2$ of an outer region 13 by a dimension H. With regard to an effective diameter D of the cutting tip 1, the offset H corresponds to approximately 0.15×D.

Shown in FIGS. 5a to 5d is a fifth cutting tip 1 which, unlike the cutting tip shown in FIGS. 2a to 2c, has a pyramidal point 15 with a rounded-off tip 34. The rounded-off tip 34 is shown in an enlarged view in FIG. 5d and has a rounding radius R which corresponds approximately to an effective diameter D of the cutting tip 1.

Shown in FIGS. 6a to 6d is a sixth cutting tip 1 which, unlike the cutting tip shown in FIGS. 3a to 3c, has a pyramidal point 15 with a rounded-off tip 34. The rounded-off tip 34 is shown in an enlarged view in FIG. 6d and has a rounding radius R which corresponds approximately to an effective diameter D of the cutting tip 1.

Figure 7A:
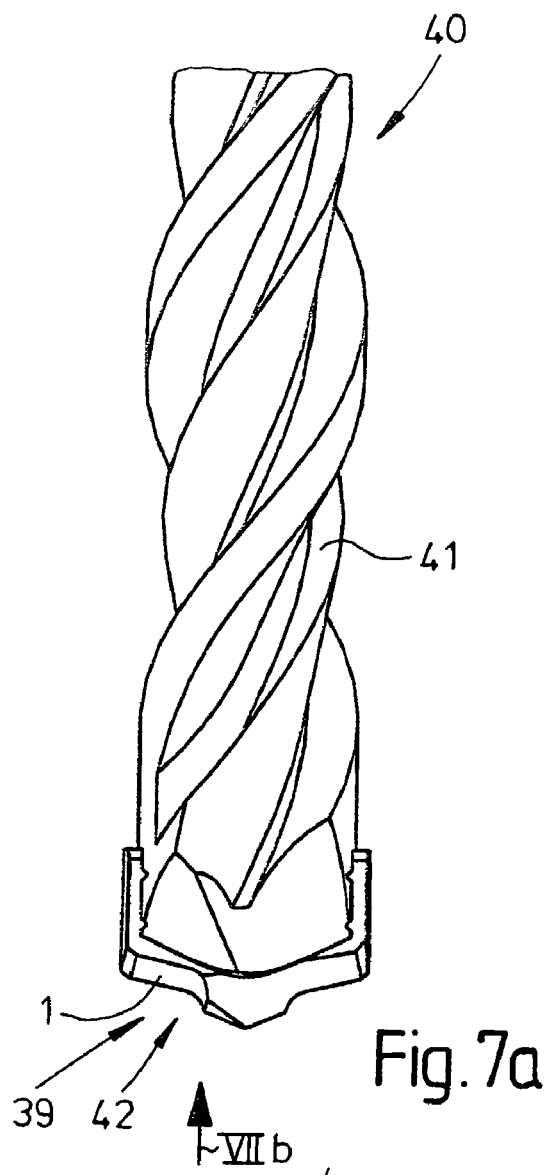
FIG. 7a shows a side view of a point region of a hammer drill having a cutting tip according to the invention.

A point region 39 of a hammer drill 40 is shown in FIG. 7a. The point region 39 has a conveying helix 41 which has a slot 43 (see FIG. 7c) in a head region 42, a cutting tip 1 being accommodated in this slot 43. In its essential features, the cutting tip 1 corresponds approximately to the cutting tip shown in FIGS. 1a to 1c. With regard to the configuration of the conveying helix, reference is made to DE 197 53 731 A1, in which such a conveying helix is described.

Figure 7B:
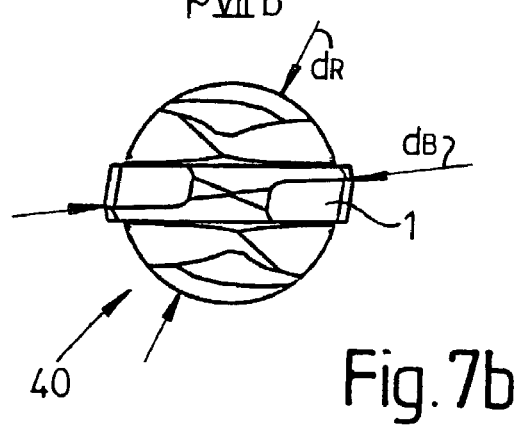
FIG. 7b shows a plan view of the hammer drill shown in FIG. 7a from arrow direction VIIb.

A plan view of the hammer drill 40 shown in FIG. 7a is shown in FIG. 7b from an arrow direction VIIb. The cutting tip 1 projects with a drill diameter $d_B$ beyond a land diameter $d_R$ of the conveying helix 41.

Figure 7C:
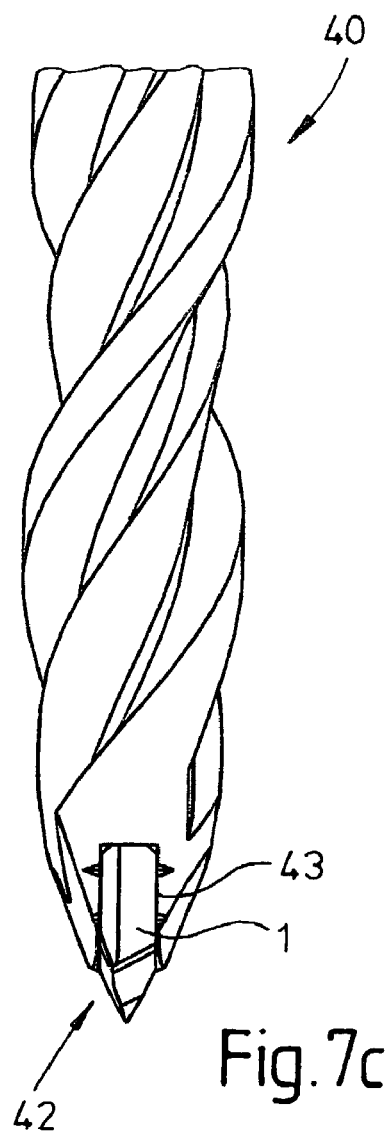
FIG. 7c shows a view rotated by 90 degrees of the hammer drill shown in FIG. 7a, FIG. 8a shows a side view of a point region of a hammer drill having a cross lip.

The partial view of the hammer drill 40 shown in FIG. 7a is shown in FIG. 7c from a perspective rotated by 90 degrees.

The cutting tip 1 is embedded deep into the slot 43, which runs through the head region 42.

A point region 39 of a further hammer drill 40 is depicted in FIG. 8a. A conveying helix 41 merges into a head region 42, which has a cross lip 44. The cross lip 44 is formed from a cutting tip 1 and two auxiliary cutting tips 45, 46. The cutting tip 1 essentially corresponds to the cutting tip shown in FIGS. 1a to 1c.

The hammer drill 40 shown in FIG. 8a is depicted rotated by about 90 degrees in FIG. 8b. Only the auxiliary cutting tip 46 and the cutting tip 1 can be seen in this view.

A plan view of the hammer drill 40 shown in FIG. 8b is shown in FIG. 8c from an arrow direction VIIIc. The x-shaped arrangement of the cutting elements 1, 45, 46 relative to one another can be seen in this view.

The invention is not restricted to the exemplary embodiments shown and described. On the contrary, it comprises developments of the invention within the scope of the patent claims; in particular, provision is also made for the cutting tip to be designed in a cross shape in plan view. As modifications of the cross-shaped cutting tip, three-blade or multi-blade cutting tips are also provided according to the invention, the cross-shaped cutting tip corresponding to a four-blade cutting tip. Furthermore, the features according to the invention may also be applied to a solid carbide head without any problems.

| | List of designations |
|---|---|
| 1 | Cutting tip (carbide cutting tip) |
| 2 | Drill shank |
| 3 | Side surface |
| 4 | Side surface |

| | -continued |
|---|---|
| | List of designations |
| 5 | Side surface |
| 6 | Side surface |
| 7 | Tool longitudinal center axis |
| 8 | Transverse center plane |
| 9 | Longitudinal center plane f |
| 10 | Lip |
| 11 | Lip |
| 12 | Central region |
| 13 | Outer region |
| 14 | Outer region |
| 15 | Pyramidal point |
| 16 | Step |
| 17 | Cutting edge of 10 |
| 18 | Cutting edge of 11 |
| 19 | Gable |
| 20 | Arrow |
| 21 | Ground surface |
| 22 | Rake face of 10 |
| 23 | Flank of 10 |
| 24 | Rake face of 11 |
| 25 | Flank of 11 |
| 26 | Transition edge |
| 27 | Intersection |
| 28 | Tip of 15 |
| 29 | Transition region |
| 30 | Transition region |
| 31 | Bevel |
| 32 | Bevel |
| 33 | Sectional surface of 23 |
| 34 | Rounded-off tip of 15 |
| 35 | Rhombus |
| 36 | Drilling tool |
| 37 | Lateral surface of a cone |
| 38 | Lateral surface of a cone |
| 39 | Point region |
| 40 | Hammer drill |
| 41 | Conveying helix |
| 42 | Head region |
| 43 | Slot |
| 44 | Cross lip |
| 45 | Auxiliary cutting tip |
| 46 | Auxiliary cutting tip |

The invention claimed is:

1. A drilling tool, comprising:
   a single- or multi-edge tool head with at least one cutting body having cutting edges, the cutting body having
   a central region which is designed in a roof shape with rake faces and flanks; and
   two outer regions set back relative to the central region in a drilling direction of the drill, one outer region being positioned on either side of the central region in a direction perpendicular to the drilling direction,
   wherein the rake faces and flanks of the central region form a pyramidal point having a rounded-off tip and form non-chisel edges.

2. The drilling tool according to claim 1, wherein the cutting edges in the outer region are formed by planar or rounded-off bevels.

3. The drilling tool according to claim 2, wherein the bevel, projected in the vertical direction, in drilling tools having an effective diameter D of up to 25 mm, has a width of about 0.1 to about 0.5 mm.

4. The drilling tool according to claim 2, wherein the bevel, projected in the vertical direction, in drilling tools having an effective diameter D of 25 mm to 50 mm, has a width of about 0.5 to about 1 mm.

5. The drilling tool according to claim 2, wherein the bevel, projected in the vertical direction, in drilling tools having an effective diameter D>50 mm, has a width of about 1 mm to about 2 mm.

6. The drilling tool according to claim 1, wherein the cutting edges in the outer regions have bevels which have a cross section selected from the group consisting of planar, concave, convex, and polyline.

7. The drilling tool according to claim 1, wherein the central region has a point angle which is smaller than a point angle which the outer regions form with one another.

8. The drilling tool according to claim 1, wherein the central region has a point angle of about 135° and the outer regions have a point angle of about 155°.

9. The drilling tool according to claim 1, wherein the rounded-off tip is rounded off spherically or in an egg shape.

10. The drilling tool according to claim 2, wherein the bevel has a constant width.

11. The drilling tool according to claim 2, wherein the bevel has a width increasing or decreasing radially outward.

12. The drilling tool according to claim 1, wherein the pyramidal point has an effective diameter which corresponds to at least 0.2 times an effective diameter D of the cutting tip.

13. The drilling tool according to claim 1, wherein a lateral surface of a cone through the cutting edges of the central region is at a distance from a lateral surface of a cone through the cutting edges of the outer region in the axial direction.

14. The drilling tool according to claim 1, for working concrete, rock, or masonry, said at least one cutting body being made of carbide, further comprising at least one secondary cutting body arranged at an angle to the said at least one cutting body.

15. The drilling tool according to claim 14, wherein the cutting edges in the outer region are formed by planar or rounded-off bevels.

16. The drilling tool according to claim 14, wherein the drill head has an essentially square or rectangular cross section, through which the main cutting body passes essentially diagonally.

17. The drilling tool according to claim 14, wherein at least one secondary cutting body is provided as a secondary cutting tip arranged at an obtuse angle λ to the cutting face of the main cutting body.

18. A drilling tool, comprising:
a single- or multi-edge tool head with at least one cutting body having cutting edges, the cutting body having
a central region which is designed in a roof shape with rake faces and flanks, the central region having a point angle of about 135°; and
two outer regions set back relative to the central region in a drilling direction of the drill, one outer region being positioned on either side of the central region in a direction perpendicular to the drilling direction, the outer regions having a point angle of about 155°,
wherein the rake faces and flanks of the central region form a pyramidal point and form non-chisel edges.

19. A drilling tool, comprising:
a single- or multi-edge tool head with at least one cutting body having cutting edges, the cutting body having
a central region which is designed in a roof shape with rake faces and flanks; and
two outer regions set back relative to the central region in a drilling direction of the drill, one outer region being positioned on either side of the central region in a direction perpendicular to the drilling direction,
wherein the rake faces and flanks of the central region form a pyramidal point and form non-chisel edges, and the cutting edges in the outer region are formed by planar or rounded-off bevels having a width that decreases radially outward.

20. A drilling tool, comprising:
a single- or multi-edge tool head with at least one cutting body having cutting edges, the cutting body having
a central region which is designed in a roof shape with rake faces and flanks; and
two outer regions set back relative to the central region in a drilling direction of the drill, one outer region being positioned on either side of the central region in a direction perpendicular to the drilling direction,
wherein the rake faces and flanks of the central region form a pyramidal point and form non-chisel edges, and the cutting edges in the outer region are formed by planar or rounded-off bevels having a width that increases radially outward.

21. A drilling tool, comprising:
a single- or multi-edge tool head with at least one cutting body having cutting edges, the cutting body having
a central region which is designed in a roof shape with rake faces and flanks; and
two outer regions set back relative to the central region in a drilling direction of the drill, one outer region being positioned on either side of the central region in a direction perpendicular to the drilling direction,
wherein the rake faces and flanks of the central region form a pyramidal point and form non-chisel edges, and wherein a lateral surface of a cone through the cutting edges of the central region is at a distance from a lateral surface of a cone through the cutting edges of the outer region in the axial direction.

* * * * *